(12) United States Patent
Roberts et al.

(10) Patent No.: US 11,945,541 B2
(45) Date of Patent: Apr. 2, 2024

(54) ELECTRIC TRICYCLE

(71) Applicants: Jonathan D. Roberts, Peoria, AZ (US); Ryan J. Hamblin, Apache Junction, AZ (US)

(72) Inventors: Jonathan D. Roberts, Peoria, AZ (US); Ryan J. Hamblin, Apache Junction, AZ (US)

(73) Assignee: Jonathan D. Roberts, Glendale, AZ (US)

( * ) Notice: Subject to any disclaimer, the term of this patent is extended or adjusted under 35 U.S.C. 154(b) by 0 days.

(21) Appl. No.: 18/146,778

(22) Filed: Dec. 27, 2022

(65) Prior Publication Data

US 2023/0159128 A1 May 25, 2023

Related U.S. Application Data

(63) Continuation of application No. 17/532,344, filed on Nov. 22, 2021, now Pat. No. 11,535,329.

(51) Int. Cl.
*B62K 5/027* (2013.01)
*B60L 50/50* (2019.01)
(Continued)

(52) U.S. Cl.
CPC ............. *B62K 5/027* (2013.01); *B60L 50/50* (2019.02); *B62K 19/08* (2013.01); *B62K 21/12* (2013.01);
(Continued)

(58) Field of Classification Search
CPC ............ B62K 19/08; B62J 43/13; B62M 1/24
(Continued)

(56) References Cited

U.S. PATENT DOCUMENTS 3,598,195 A 8/1971 Steller
3,827,519 A 8/1974 Snider
(Continued)

FOREIGN PATENT DOCUMENTS

CN 106364621 A 2/2017
CN 106741490 A 5/2017
(Continued)

OTHER PUBLICATIONS

Ben Coxworth, Your next bike could be made from folded sheet metal, 2012, Urban Transport (Year: 2012).*

*Primary Examiner* — Kevin Hurley
*Assistant Examiner* — Hosam Shabara
(74) *Attorney, Agent, or Firm* — BOOTH UDALL FULLER, PLC; Pacer K. Udall

(57) ABSTRACT

An electric tricycle including a frame having a front end coupled to a steering assembly, the steering assembly having a front wheel, and a rear end coupled to a rear wheel assembly, the rear wheel assembly having two rear wheels. At least two pedals rotatably coupled to the rear wheel assembly and configured to move in a reciprocating motion, the at least two pedals having an engaged configuration wherein the at least two pedals are engaged with the two rear wheels and configured to rotate the two rear wheels in a first direction, and a disengaged configuration wherein each of the at least two pedals is disengaged from the two rear wheels and aligned with another of the at least two pedals. An electric motor electrically coupled to a battery and configured to engage with the two rear wheels and to rotate the two rear wheels in the first direction.

20 Claims, 16 Drawing Sheets

(51) Int. Cl.
*B62J 43/13* (2020.01)
*B62K 19/08* (2006.01)
*B62K 21/12* (2006.01)
*B62K 23/08* (2006.01)
*B62M 6/60* (2010.01)

(52) U.S. Cl.
CPC ............... *B62K 23/08* (2013.01); *B62M 6/60* (2013.01); *B62J 43/13* (2020.02)

(58) Field of Classification Search
USPC ........................................................ 180/216
See application file for complete search history.

(56) References Cited

U.S. PATENT DOCUMENTS

| | | |
|---|---|---|
| 4,111,274 A | 9/1978 | King |
| 4,325,448 A | 4/1982 | Pivar |
| 6,032,969 A * | 3/2000 | Kurgan .................... B62M 1/24 |
| | | 280/233 |
| 6,158,542 A | 12/2000 | Nolet |
| 7,661,501 B1 | 2/2010 | Perdue |
| 9,994,283 B1 * | 6/2018 | Bleifuss ................... B62K 5/06 |
| 10,513,304 B2 | 12/2019 | Thomson |
| 11,235,832 B2 | 2/2022 | Kawabata |
| 11,459,059 B2 * | 10/2022 | Gendell .................... B62M 1/30 |
| 11,535,329 B1 * | 12/2022 | Roberts .................... B62K 5/02 |
| 2006/0070784 A1 * | 4/2006 | Tahara ..................... B62M 6/40 |
| | | 180/206.7 |
| 2013/0168942 A1 * | 7/2013 | Musgrove ................ B62M 9/04 |
| | | 74/37 |
| 2013/0205928 A1 * | 8/2013 | Hansen .................... B62M 1/24 |
| | | 74/37 |
| 2020/0317288 A1 | 10/2020 | Jones |

FOREIGN PATENT DOCUMENTS

| | | | | |
|---|---|---|---|---|
| CN | 111717320 A | * | 9/2020 | .............. B62M 6/60 |
| CN | 113002686 A | * | 6/2021 | ................ B62J 1/00 |
| EP | 3205564 A2 | | 8/2017 | |

* cited by examiner

ELECTRIC TRICYCLE

CROSS-REFERENCE TO RELATED APPLICATIONS

This application is a continuation of, and claims the benefit of, U.S. patent application Ser. No. 17/532,344 filed Nov. 22, 2021 titled "ELECTRIC TRICYCLE". The entirety of the above-referenced disclosure is hereby incorporated herein by this reference.

TECHNICAL FIELD

Aspects of this document relate generally to electric tricycles, and more specifically to electric tricycles with pedals.

BACKGROUND

Three-wheeled vehicles such as tricycles are a popular form of recreation. Users of a tricycle typically use pedals to propel the tricycle forward, without the option of moving in reverse under pedal power. Movement through pedaling requires that the energy for movement come from the user, such as through a gear and articulated chain. Additionally, if a user needs to back up, the user must stop and scoot the tricycle back by pushing off the ground. Gasoline powered tricycles or ATCs have seen a decline in use and are powered by a gasoline engine rather than by pedal or by an electric motor.

SUMMARY

Aspects of this document relate to an electric tricycle comprising a tricycle frame having a front end coupled to a steering assembly, the steering assembly having handlebars and only one front wheel, and a rear end coupled to a rear wheel assembly, the rear wheel assembly having two rear wheels mounted on a rear axle. At least two pedals rotatably coupled to the rear wheel assembly, the at least two pedals having an engaged configuration wherein the at least two pedals are engaged with the rear axle and configured to move in a reciprocating motion and rotate the rear axle in a first direction, and a disengaged configuration wherein each of the at least two pedals is disengaged from the rear axle, fixed in relation to the tricycle frame, and aligned with another of the at least two pedals. An electric motor mounted on the rear wheel assembly, electrically coupled to a battery, and configured to engage with the rear axle when the at least two pedals are in the disengaged configuration, the electric motor having a forward clutch configured to rotate the rear axle in the first direction and a reverse clutch configured to rotate the rear axle in a second direction opposite the first direction.

Particular embodiments may comprise one or more of the following features.

The reciprocating motion comprises an arc.

The arc is less than 360 degrees.

When moving in the reciprocating motion, a first pedal of the at least two pedals and a second pedal of the at least two pedals move in opposite directions.

Aspects of this document relate to an electric tricycle comprising a tricycle frame having a front end coupled to a steering assembly, the steering assembly having a front wheel, and a rear end coupled to a rear wheel assembly, the rear wheel assembly having two rear wheels mounted on a rear axle. At least two pedals rotatably coupled to the rear wheel assembly and configured to move in a reciprocating motion, the at least two pedals having an engaged configuration wherein the at least two pedals are engaged with the rear axle and configured to rotate the rear axle in a first direction, and a disengaged configuration wherein each of the at least two pedals is disengaged from the rear axle. An electric motor mounted on the rear wheel assembly, electrically coupled to a battery, and configured to engage with the rear axle when the at least two pedals are in the disengaged configuration, the electric motor configured to rotate the rear axle in the first direction and in a second direction opposite the first direction.

Particular embodiments may comprise one or more of the following features.

The reciprocating motion comprises an arc of less than 360 degrees.

The at least two pedals are in the disengaged configuration, each of the at least two pedals is fixed in relation to the tricycle frame and aligned with another of the at least two pedals.

When moving in the reciprocating motion, a first pedal of the at least two pedals and a second pedal of the at least two pedals move in opposite directions.

The electric motor having a forward clutch configured to rotate the rear axle in the first direction.

The electric motor having a reverse clutch configured to rotate the rear axle in the second direction.

Aspects of this document relate to an electric tricycle comprising a frame having a front end coupled to a steering assembly, the steering assembly having a front wheel, and a rear end coupled to a rear wheel assembly, the rear wheel assembly having two rear wheels. At least two pedals rotatably coupled to the rear wheel assembly and configured to move in a reciprocating motion, the at least two pedals having an engaged configuration wherein the at least two pedals are engaged with the two rear wheels and configured to rotate the two rear wheels in a first direction, and a disengaged configuration wherein each of the at least two pedals is disengaged from the two rear wheels and aligned with another of the at least two pedals. An electric motor electrically coupled to a battery and configured to engage with the two rear wheels and to rotate the two rear wheels in the first direction.

Particular embodiments may comprise one or more of the following features.

When moving in the reciprocating motion, a first pedal of the at least two pedals and a second pedal of the at least two pedals move in opposite directions.

The electric motor having a forward clutch configured to rotate the two rear wheels in the first direction.

The electric motor is also configured to rotate the two rear wheels in a second direction opposite the first direction. The electric motor having a reverse clutch configured to rotate the two rear wheels in the second direction.

The frame is formed of sheet metal.

The frame is formed of tubing.

The reciprocating motion comprises an arc. The arc is less than 360 degrees.

The steering assembly further having handlebars.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that they can be their own lexicographers if desired.

The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and.

Figure 1:
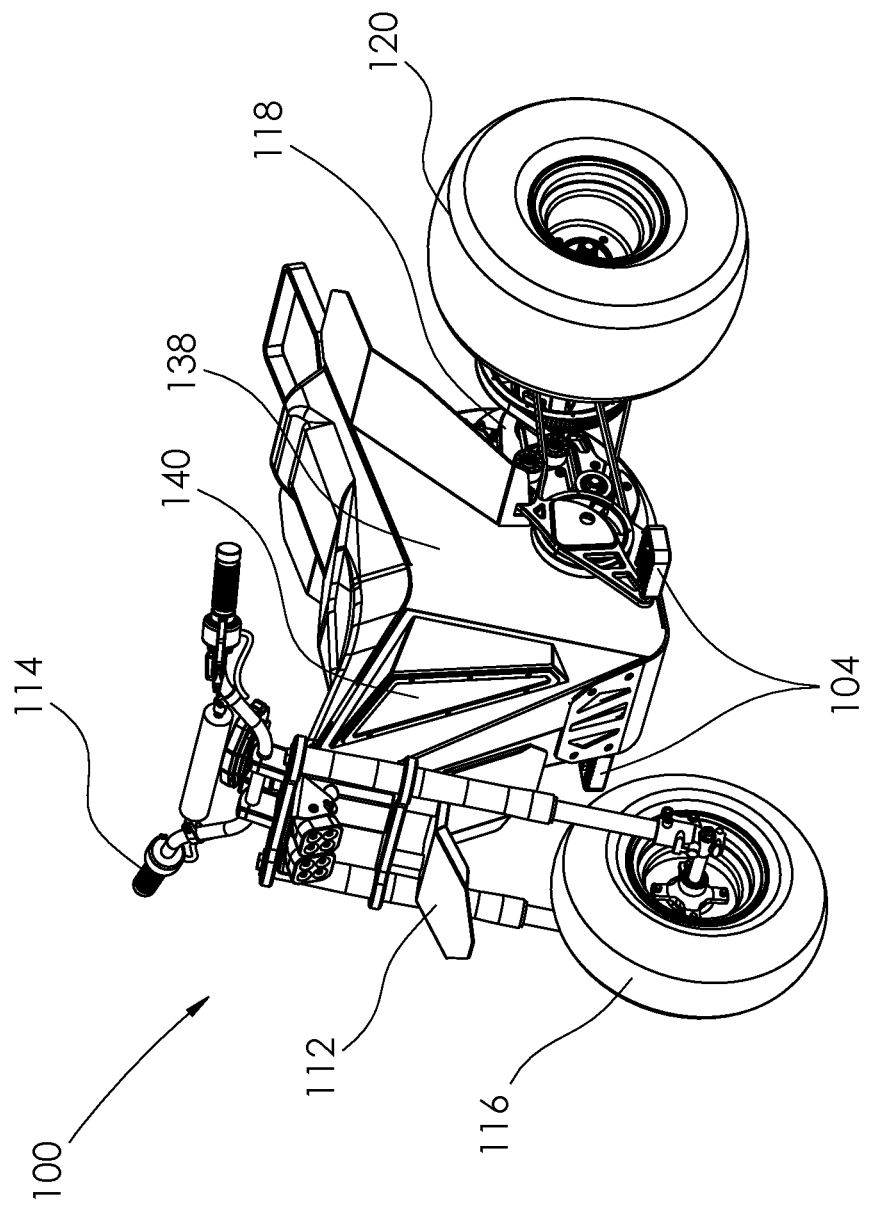
FIG. 1 is a perspective view of an electric tricycle.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of implementations that are described in many different forms, there is shown in the drawings and will herein be described in detail particular implementations with the understanding that the present disclosure is to be considered as an exemplification of the principles of the disclosed methods and systems, and is not intended to limit the broad aspect of the disclosed concepts to the implementations illustrated.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

The present disclosure is related to an electric tricycle or trike 100. The electric tricycle 100 is designed to provide both a powered mode where the electric tricycle 100 is driven by an electric motor 102 and a manual mode where the electric tricycle 100 is driven by the user through at least two pedals 104.

Figure 2:
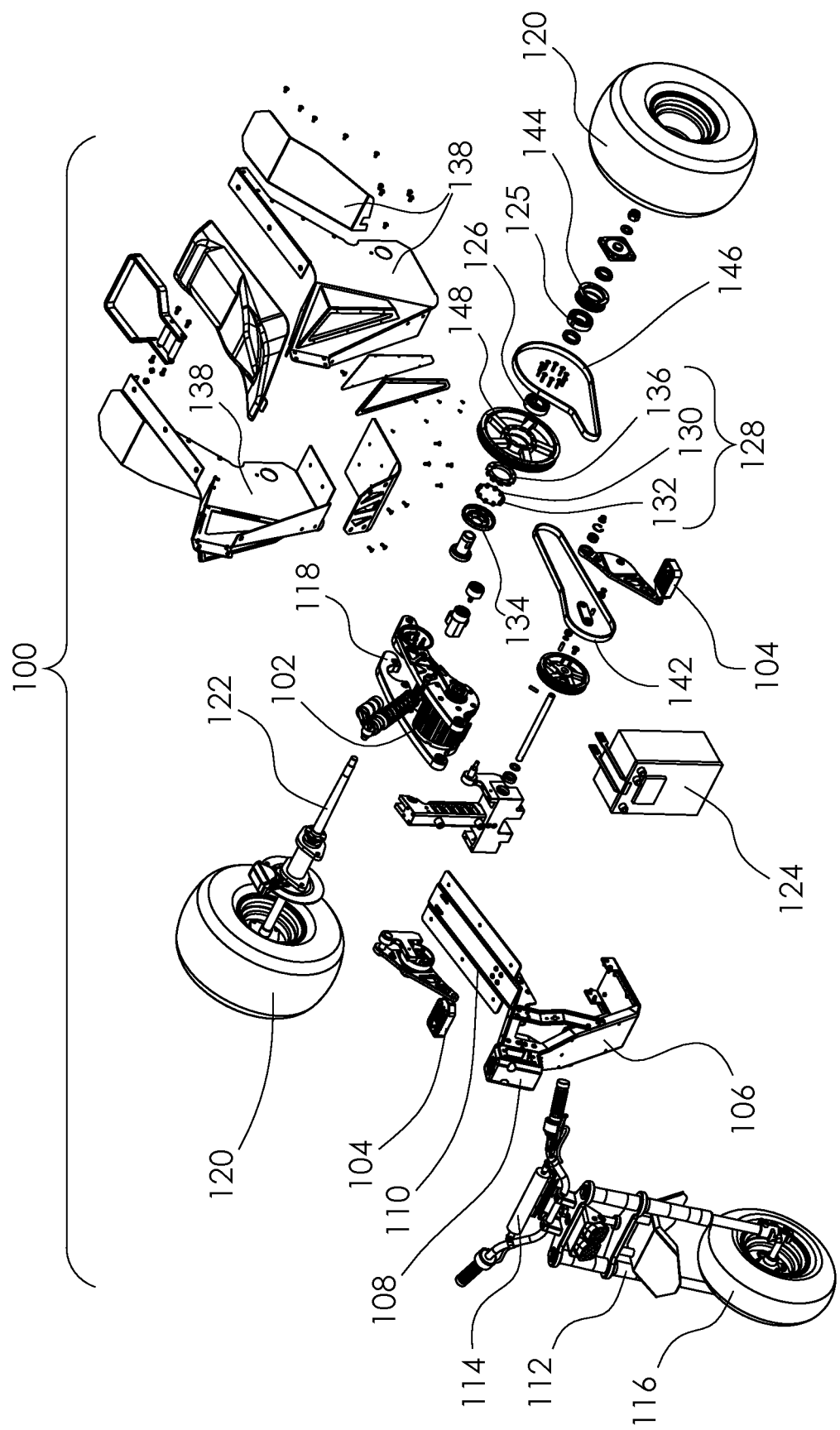
FIG. 2 is an exploded view of the electric tricycle shown in FIG. 1.
Figure 3:
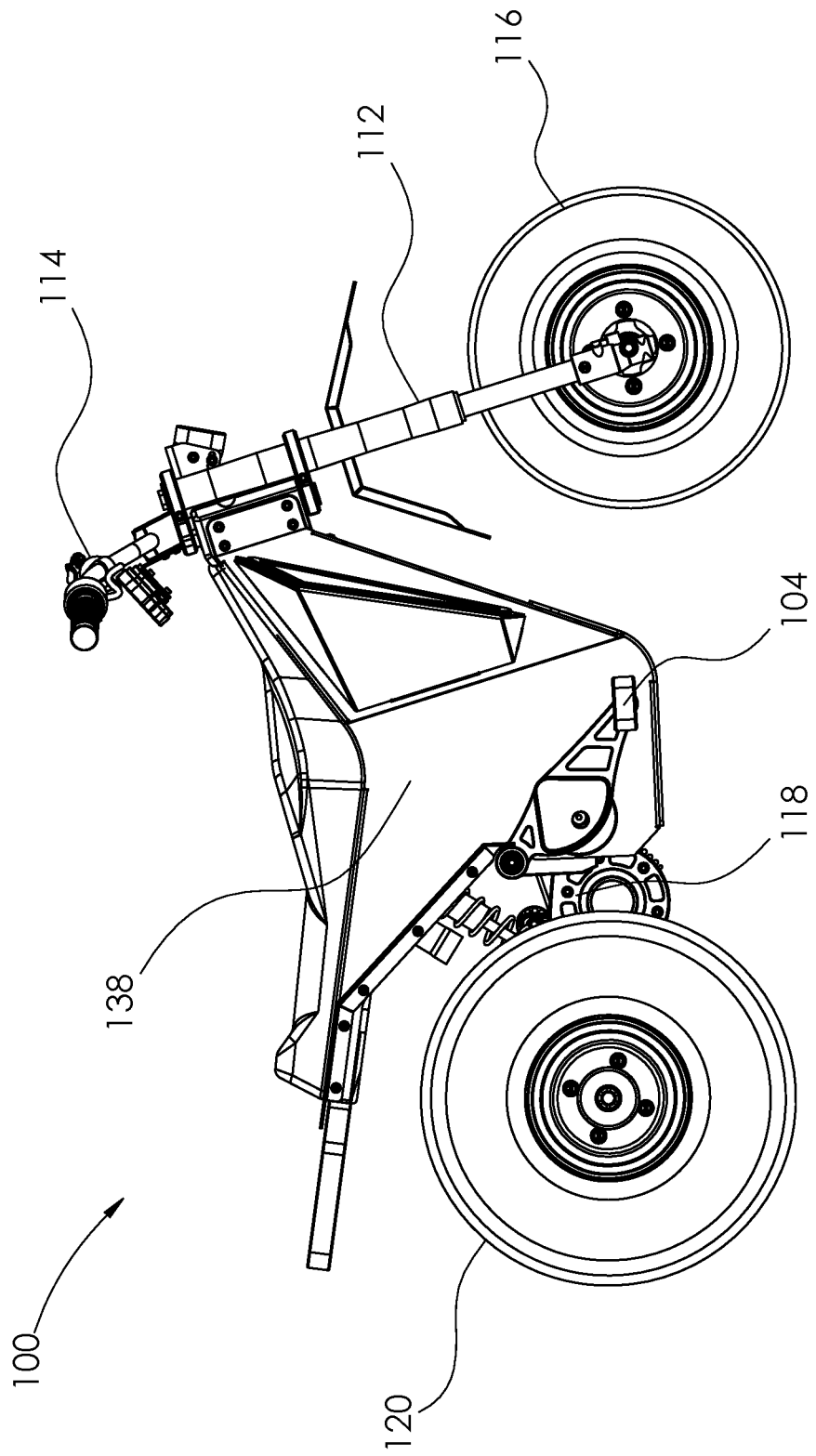
FIG. 3 is a right-side view of the electric tricycle shown in FIG. 1.
Figure 4:
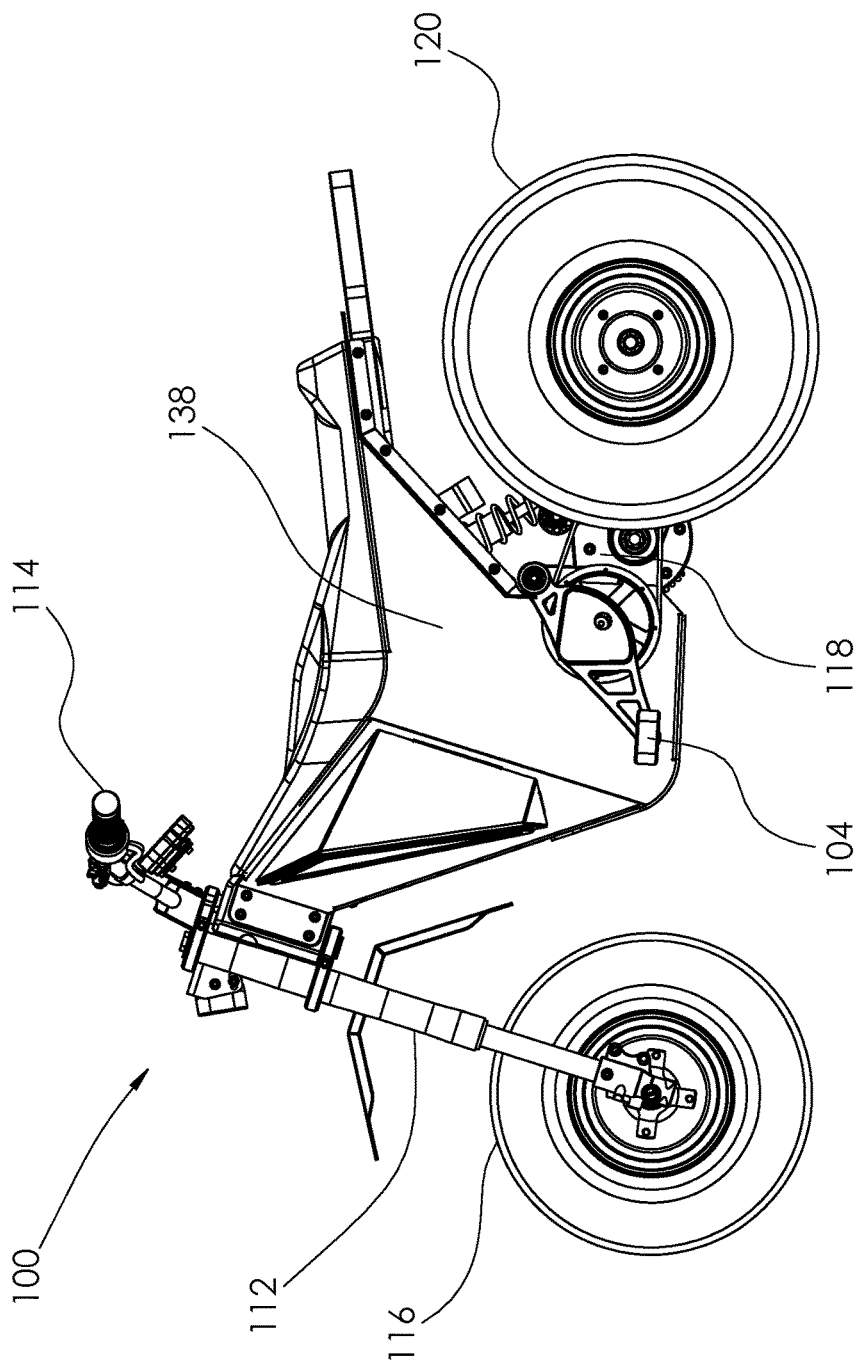
FIG. 4 is a left-side view of the electric tricycle shown in FIG. 1.
Figure 5:
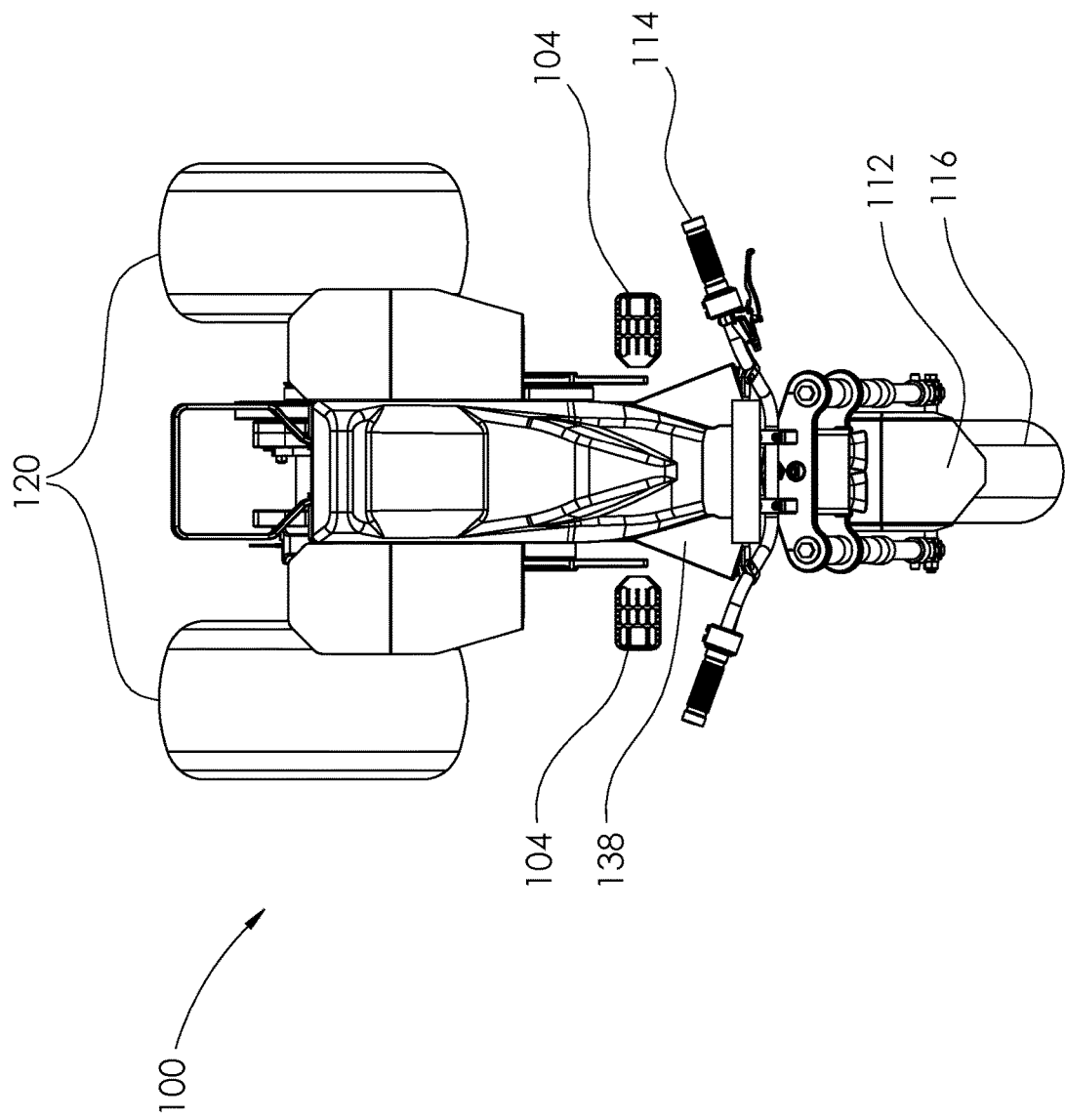
FIG. 5 is a top view of the electric tricycle shown in FIG. 1.
Figure 6:
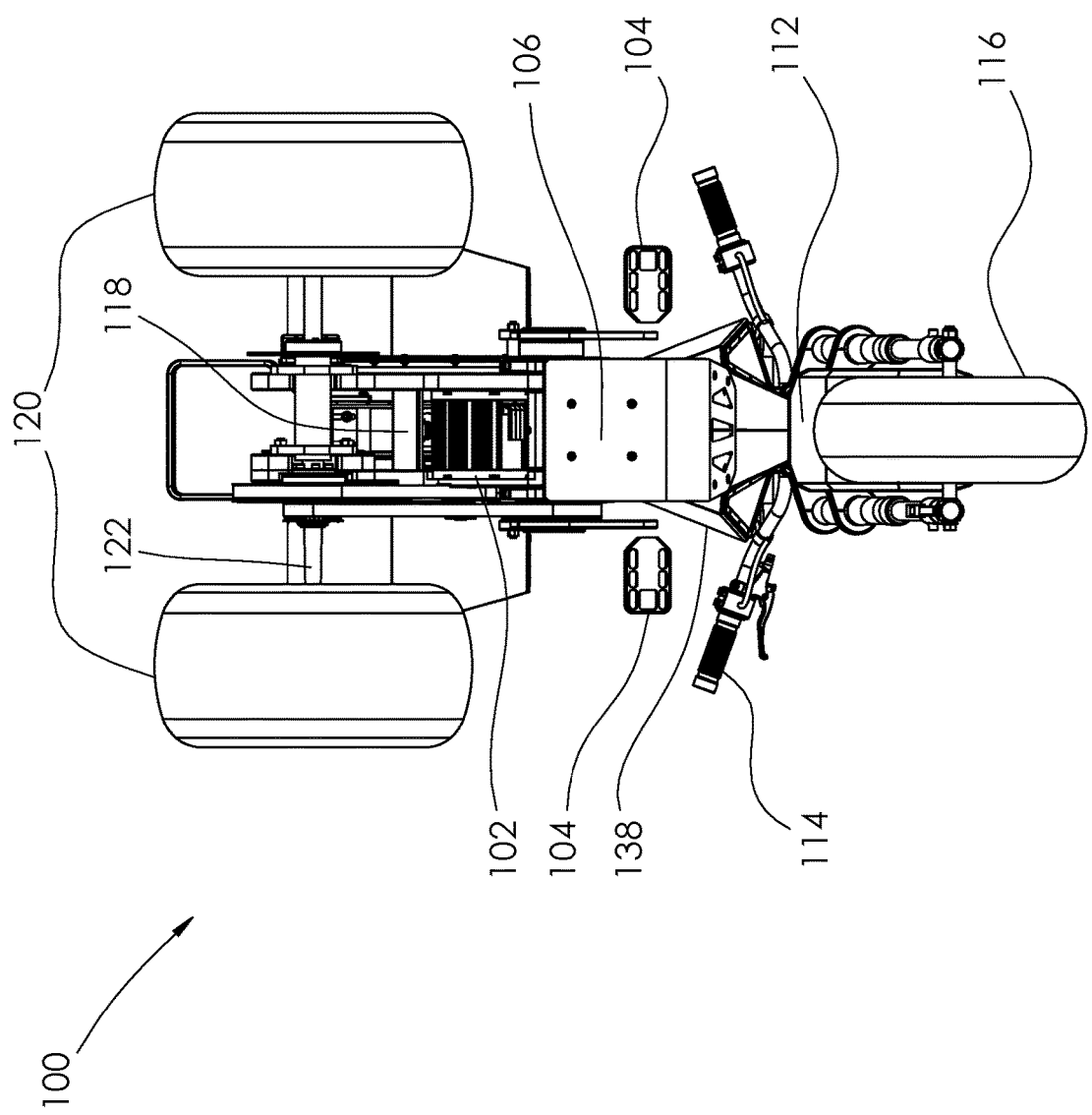
FIG. 6 is a bottom view of the electric tricycle shown in FIG. 1.
Figure 7:
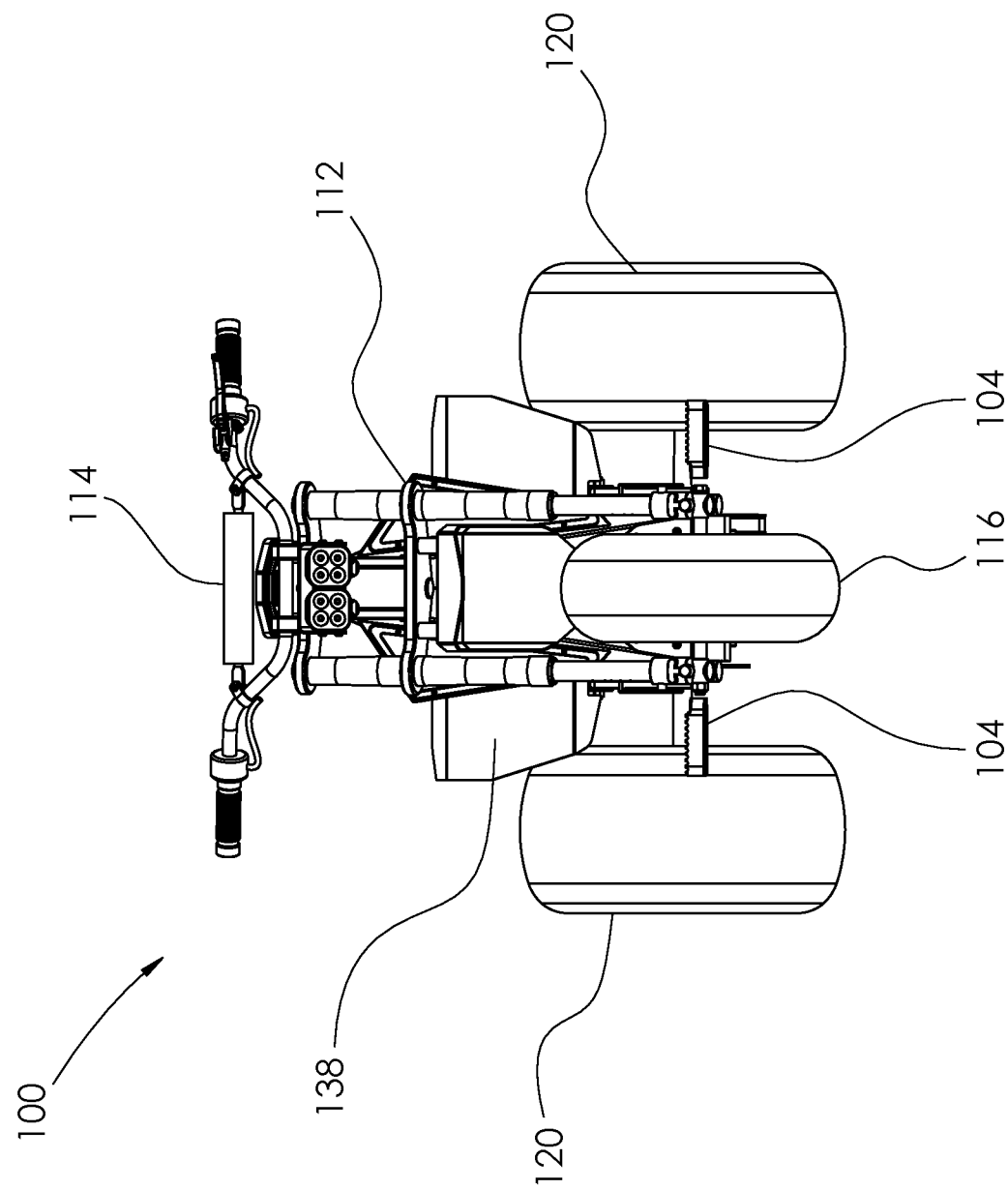
FIG. 7 is a front view of the electric tricycle shown in FIG. 1.
Figure 8:
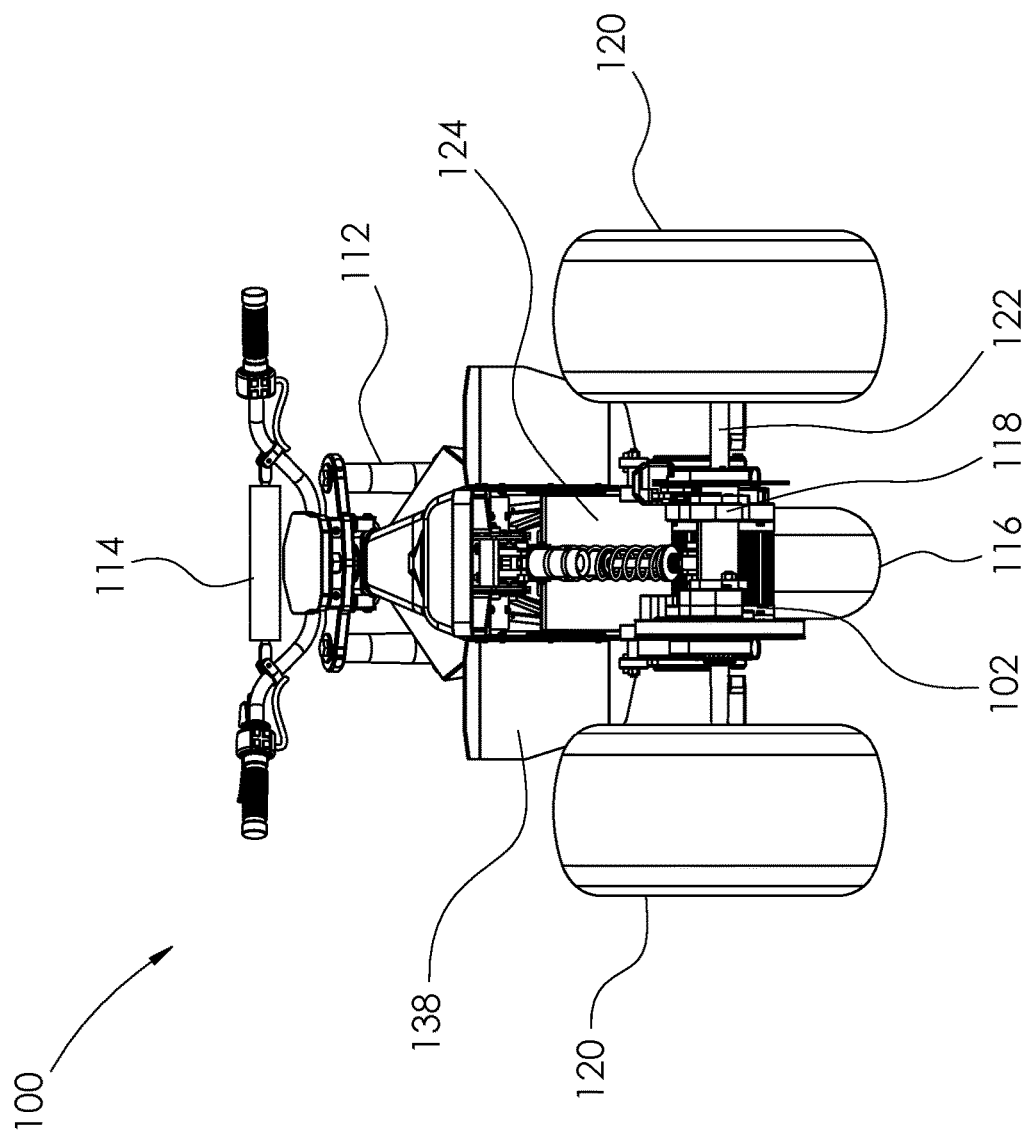
FIG. 8 is a back view of the electric tricycle shown in FIG. 1.
Figure 11:
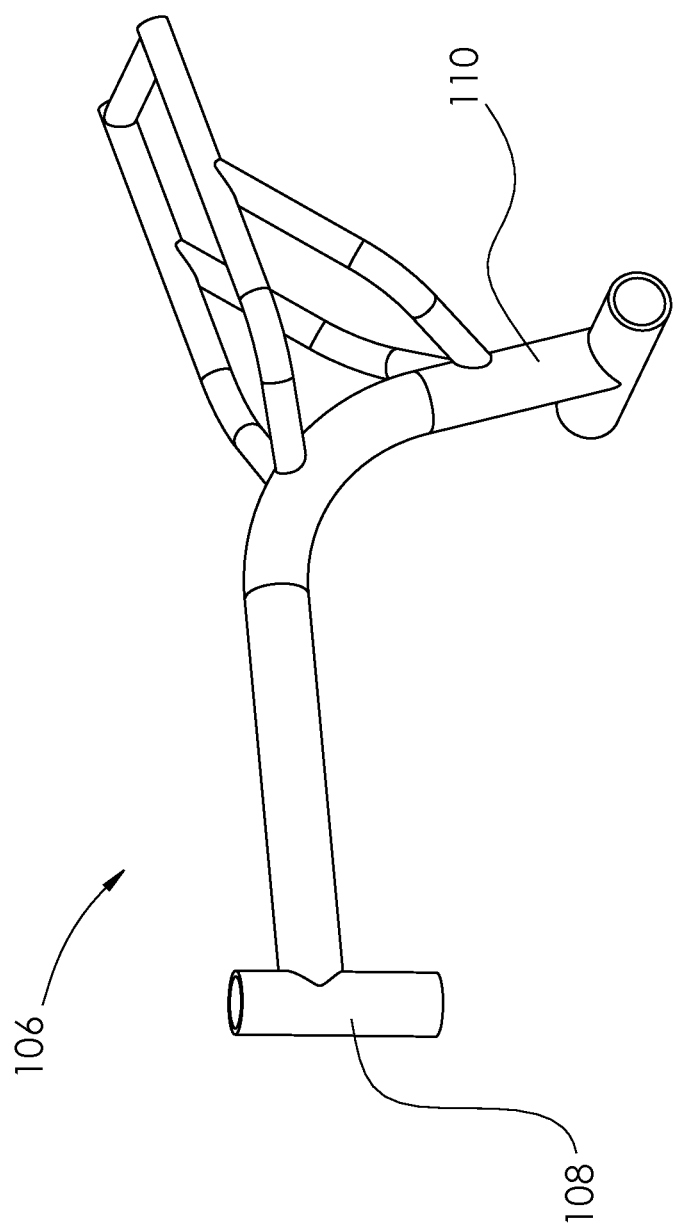
FIG. 11 is an embodiment of a tricycle frame of the electric tricycle formed of tubing.

Turning specifically to FIGS. 1-8, the electric tricycle 100 has a tricycle frame 106 configured to provide support and connect the components of the electric tricycle 100 together. The tricycle frame 106 may be formed of a structural material, such as metal, including steel, stainless steel, iron, aluminum, titanium, copper, or any other suitable metal or metal alloy. Other suitable materials include carbon fiber, fiberglass, or other fiber, plastics, resins, composites, and any other desirable structural material. In some instances, the structural material will be formed as a structural sheet material, which includes sheet metal, as shown in FIG. 2. Forming the frame 106 of the trike 100 of a structural sheet material allows the tricycle frame 106 to be more easily produced on a large scale and may reduce, limit, or remove a need for welding the frame 106. The tricycle frame 106 may also be formed of tubing (see FIG. 11), which may be welded. For example, the frame 106 may be multiple pieces of metal tubing that have been welded together, as known in the art. The tricycle frame 106 has a front end 108 and a rear end 110. The front end 108 of the tricycle frame 106 may be coupled to a steering assembly 112. The steering assembly 112 may have handlebars 114 configured to steer the electric tricycle 100 and a front wheel 116. In particular embodiments, the front wheel 116 is only one front wheel 116. The rear end 110 of the tricycle frame 106 may be coupled to a rear wheel assembly 118. The rear wheel assembly 118 has two rear wheels 120. The two rear wheels 120 may be mounted on a rear axle 122. In particular embodiments, the two rear wheels 120 are fixedly coupled to the rear axle 122 and thus rotate together with the rear axle 122.

The at least two pedals 104 may be rotatably coupled to the rear wheel assembly 118. In some embodiments, the at least two pedals 104 are configured to rotate through at least 360 degrees in relation to the rear wheel assembly 118. In other embodiments, the at least two pedals 104 are configured to move in a reciprocating motion comprising an arc of less than 360 degrees. Thus, the at least two pedals 104 may function by moving in a circular motion similar to a typical bicycle. Alternatively, the at least two pedals 104 may function by moving up and down in a reciprocating motion. The reciprocating motion is not necessarily linear, but instead may take place as an arc, where the at least two pedals travel back and forth along the arc. The at least two pedals 104 may have an engaged configuration and a disengaged configuration. When the at least two pedals 104 are in the engaged configuration, the at least two pedals 104 may be engaged with the rear axle 122 and/or with the two rear wheels 120, and thus may be configured to rotate the rear axle 122 in a first direction. When the at least two pedals 104 are in the disengaged configuration, each pedal 104 of the at least two pedals 104 may be disengaged from the rear axle 122 and/or the two rear wheels 120. In addition, each pedal 104 may be fixed in relation to the tricycle frame 106. Thus, the pedals 104 may function as footrests or pegs when the pedals 104 are not being used for pedaling or by moving the bicycle through human power, and when the electric tricycle 100 is moving under electric power, such as being driven by the electric motor 102.

Each of the at least two pedals 104 may be aligned with another of the at least two pedals 104 when the pedals 104 function as footrests or pegs, as shown in FIGS. 1 and 5-8. Each of the at least two pedals 104 may be positioned at both a same vertical offset and a same horizontal offset (at a same time), as measured with respect to a fixed point of the trike 100, or as measured with respect to a level or planar surface on which the trike 100 is resting. Having the two pedals 104 being positioned at a same vertical and horizontal offset differs from a conventional pedal arrangement for a tricycle or a bicycle with pedals that rotate through 360 degrees, where the pedals may have a horizontal offset, a vertical offset, or both; but do not have the same position or alignment. For example, a conventional pedal arrangement for pedals that rotate through 360 degrees may: (i) be aligned vertically (such as at 12 o'clock and 6 o'clock positions) with no horizontal offset and vertical offset or separation between the pedals, (ii) be aligned horizontally (such as at 9 o'clock and 3 o'clock positions) with no vertical offset and a horizontal offset or separation between the pedals, or (iii) have different horizontal and vertical positions without being horizontally or vertically aligned (such as at 1 o'clock and 7 o'clock positions). By having the at least two pedals 104 of the trike 100 aligned with each other, the user will enjoy kinesthetic alignment with the same vertical and horizontal alignment for each leg when resting on each of the pedals 104 as the pedals 104 are, or function as, footrests or pegs.

The electric motor 102 may be mounted or positioned on, adjacent, or to the rear wheel assembly 118, while also being mechanically coupled to the rear wheel assembly 118, the rear axle 122, or both. The electric motor may also be electrically coupled to a battery or power source 124. The battery 124 may be a source of power, a voltage differential, or voltage potential that may be produced or maintained chemically, thermally, magnetically, electrically, or in any other suitable way. The battery 124 comprises Lead—Acid batteries, Nickel—Cadmium batteries, Nickel—Metal Hydride batteries, Lithium—Ion batteries, or any other suitable batteries. The battery 124 may be one or more smaller batteries or cells coupled together or a singular unit, which may be secured to the tricycle frame 106. The electric motor 102 may be configured to engage with the rear axle 122 and/or with the two rear wheels 120 when the at least two pedals 104 are in the disengaged configuration. Thus, the electric tricycle 100 may be configured to provide a powered mode in which the electric motor 102 engages with the rear axle 122 and the at least two pedals 104 are disengaged and a manual mode (user powered mode) in which the at least two pedals 104 engage with the rear axle 122 and the electric motor 102 is disengaged. The at least two pedals 104 may engage with the rear axle 122 through a pedal clutch 125 configured to rotate the rear axle 122 in the first direction. The electric motor 102 may have a forward clutch 126 configured to rotate the rear axle 122 in the first direction. Additionally, the electric motor 102 may have a reverse clutch 128 configured to rotate the rear axle 122 in a second direction opposite the first direction. Thus, the electric motor 102 may be used to drive the electric tricycle 100 forward or in reverse, while the at least two pedals 104 may only be configured to drive the electric tricycle 100 forward.

The pedal clutch 125 and the forward clutch 126 are both positioned on the rear axle 122 and may comprise a one-way bearing configured to engage with the rear axle 122 when the at least two pedals 104 are pedaled or the electric motor 102 rotates in the first direction. Because both the pedal clutch 125 and the forward clutch 126 comprise one-way bearings, the rear axle 122 is able to rotate in the first direction driven by one of the pedal clutch 125 and the forward clutch 126 without the other engaging. On the other hand, the pedal clutch 125 and the forward clutch 126 are both configured to disengage and spin freely when the electric motor 102 rotates in the second direction or when the at least two pedals 104 are not pedaled.

Figure 9A:
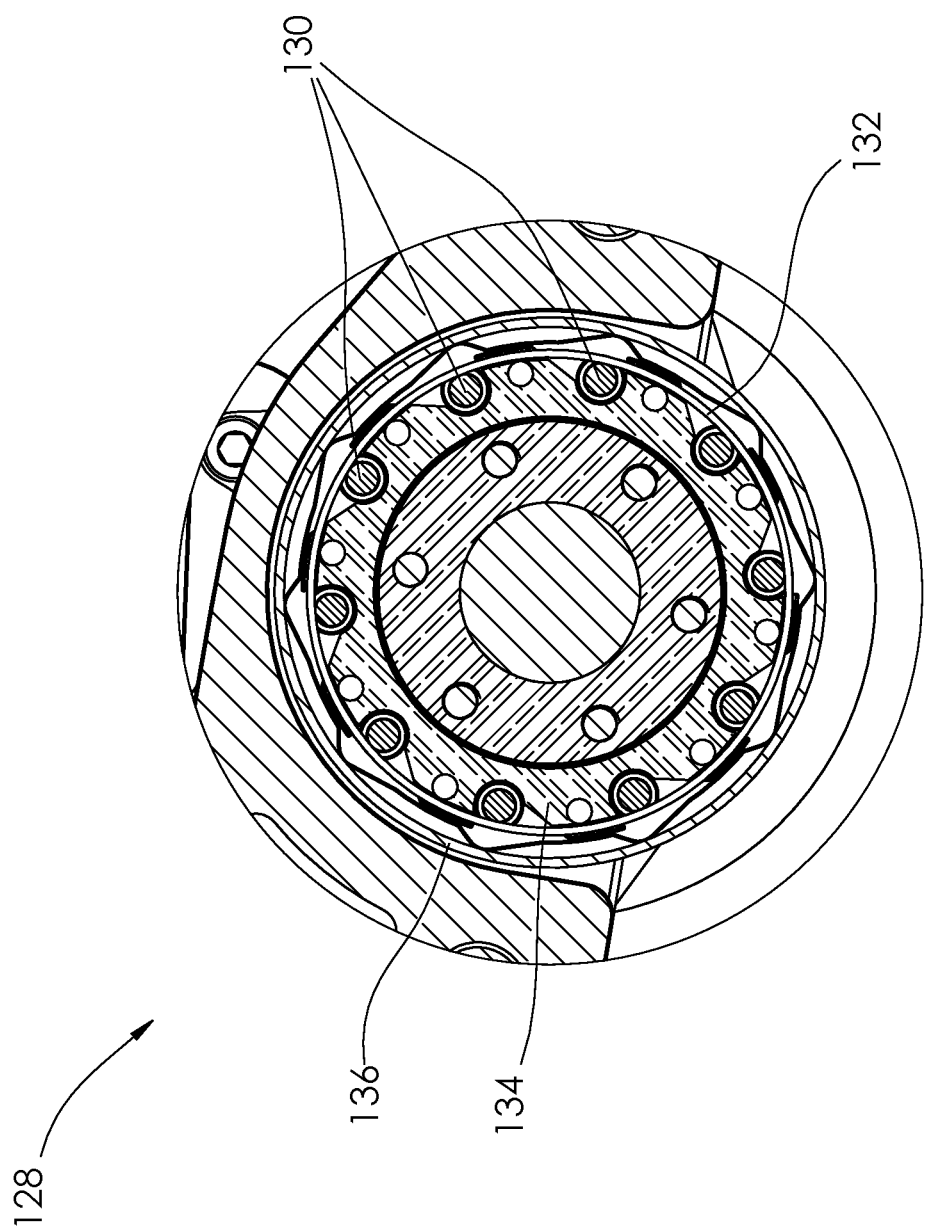
FIG. 9A is a cross section view of the reverse clutch of the electric tricycle shown in FIG. 1 when the reverse clutch is disengaged.
Figure 9B:
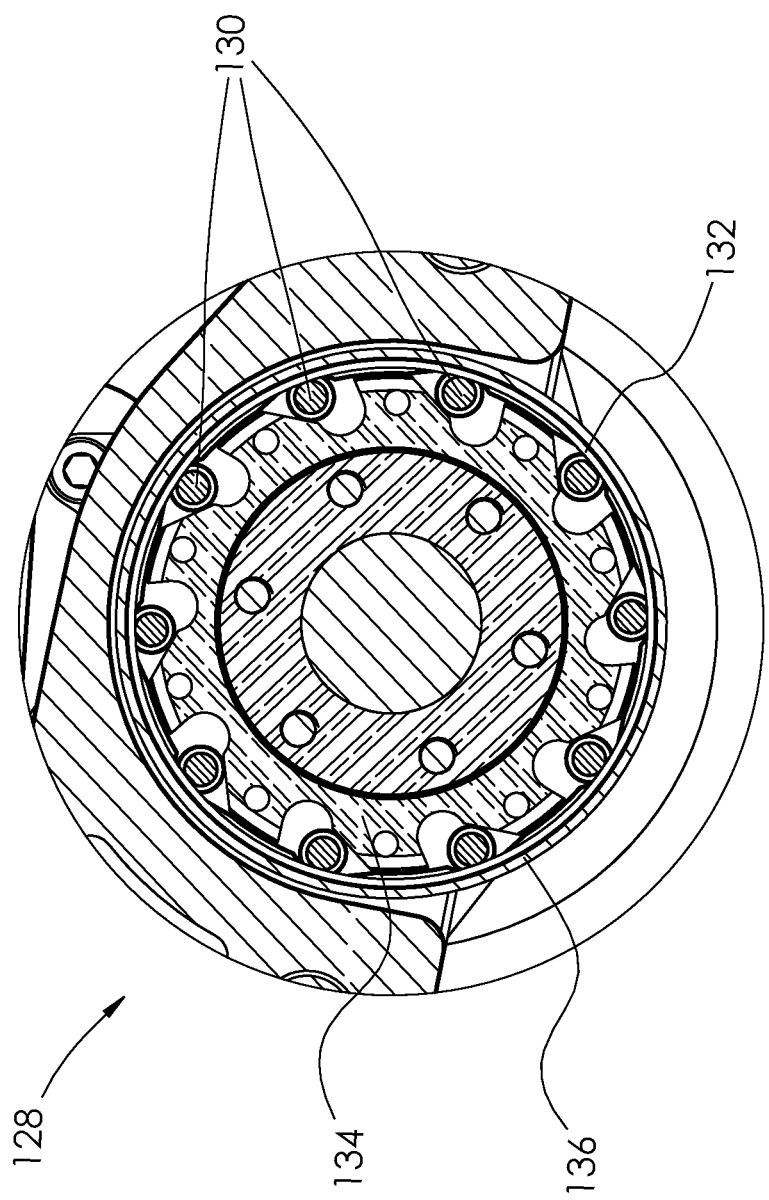
FIG. 9B is a cross section view of the reverse clutch of the electric tricycle shown in FIG. 1 when the reverse clutch is engaged.

The reverse clutch 128 is also positioned on the rear axle 122. FIGS. 9A-9B illustrate a cross section of one embodiment of the reverse clutch 128. The reverse clutch 128 may have a plurality of sprags 130. The plurality of sprags 130 is configured to engage when the reverse clutch 128 rotates in the second direction and disengage when the reverse clutch 128 rotates in the first direction. The plurality of sprags 130 may be wrapped with a continuous spring 132. The continuous spring 132 biases the plurality of sprags 130 to a retracted position in which the plurality of sprags 130 is disengaged from the outer wheel 136 and positioned adjacent to the inner wheel 134, as shown in FIG. 9A. When the electric motor 102 rotates in the second direction, the motor pulley 148 also rotates in the second direction. The inner wheel 134 is coupled to the motor pulley 148, and thus the inner wheel 134 rotates in the second direction with the electric motor 102. This motion engages the reverse clutch 128 by moving the plurality of sprags 130 to an extended position as shown in FIG. 9B. When in the extended position, each sprag 130 of the plurality of sprags 130 is positioned radially outward from the retracted position and engages with the outer wheel 136, and thus engaging with the rear axle 122 to rotate the rear axle 122 in the second direction. Once the electric motor 102 stops rotating in the second direction, the continuous spring 132 moves the plurality of sprags 130 back to the retracted position shown in FIG. 9A, allowing the rear axle 122 to spin freely and the trike 100 to coast.

The electric tricycle 100 may also have a plurality of panels 138 configured to cover the front end 108 of the tricycle frame 106. The plurality of panels 138 may be formed of plastic, resin, rubber, fiberglass, carbon fiber, metal, or any other suitable material, and may provide protection to the battery 124 and the electric motor 102 during use. The plurality of panels 138 may have vent holes 140 extending through the plurality of panels 138 to increase ventilation within the electric tricycle 100 and decrease the likelihood of the electric motor 102 or the battery 124 overheating.

Figure 10A:
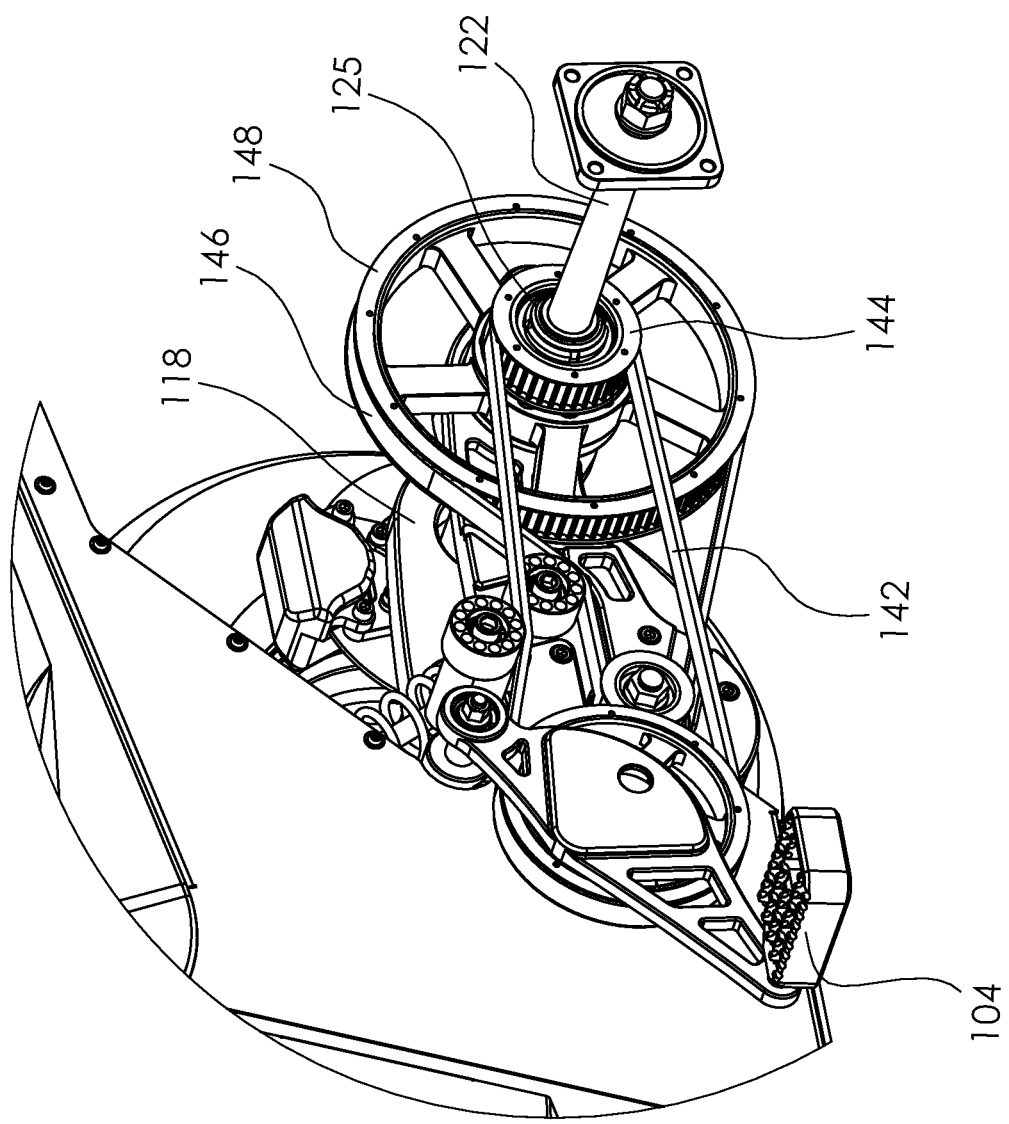
FIG. 10A is a close-up view of both the pedal drive train and the motor drive train of the electric tricycle shown in FIG. 1.
Figure 10B:
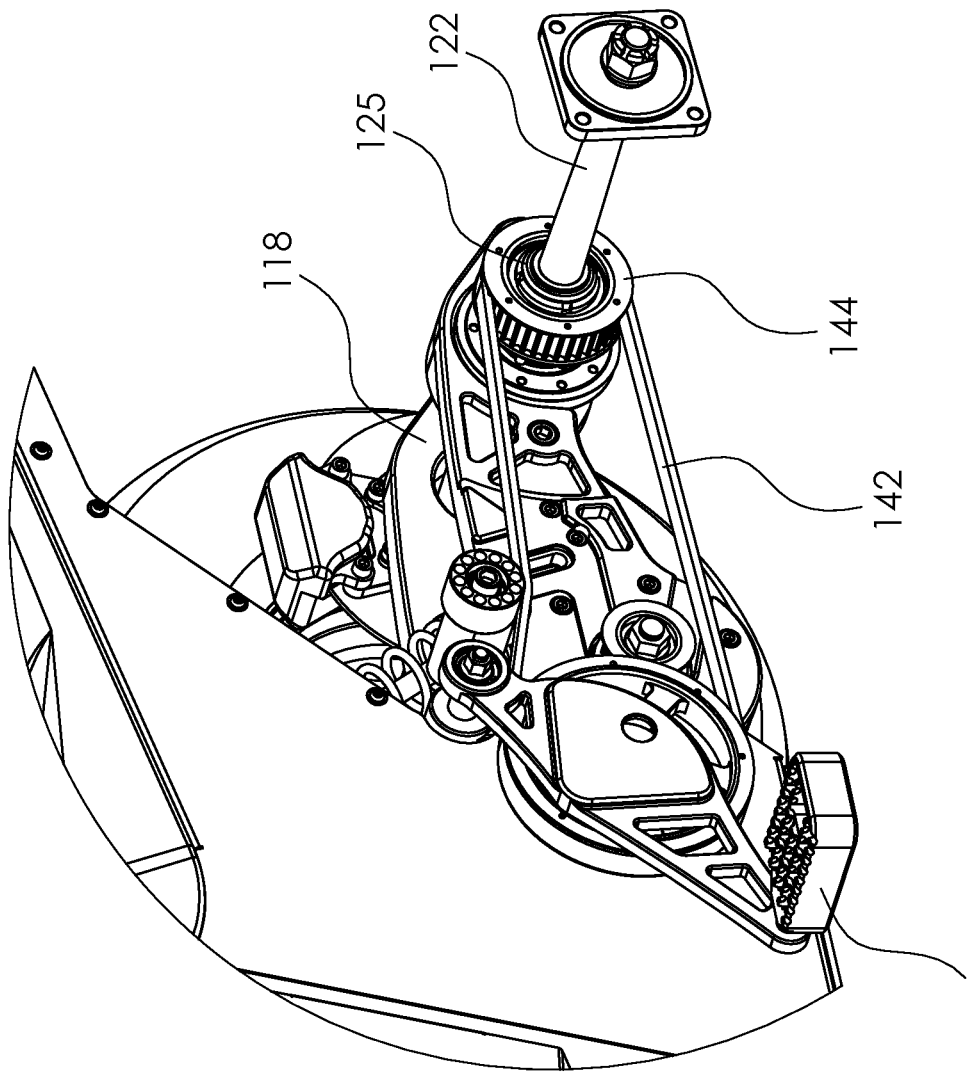
FIG. 10B is a close-up view of the pedal drive train of the electric tricycle shown in FIG. 1.
Figure 10C:
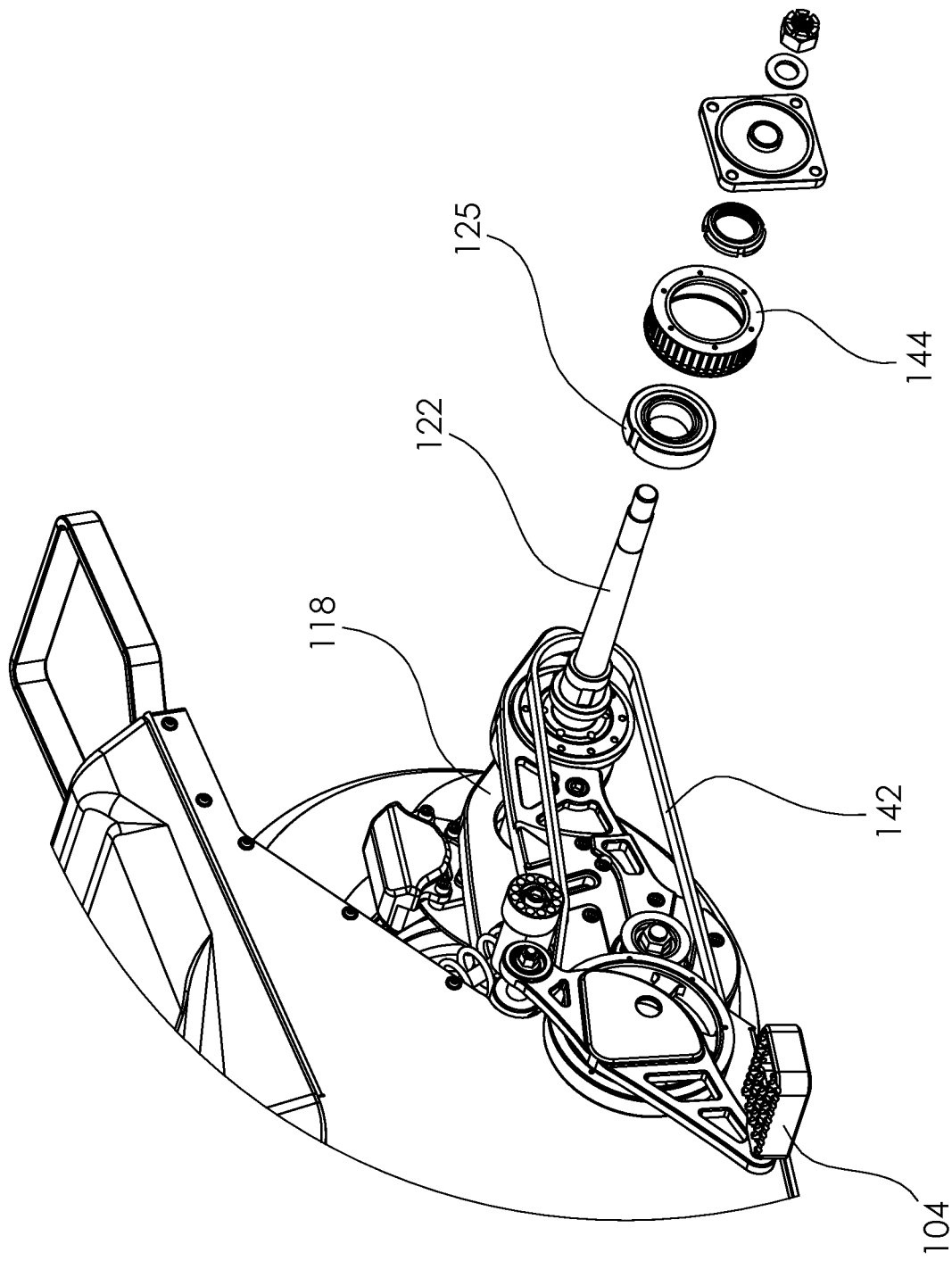
FIG. 10C is an exploded view of the pedal drive train shown in FIG. 10B.
Figure 10D:
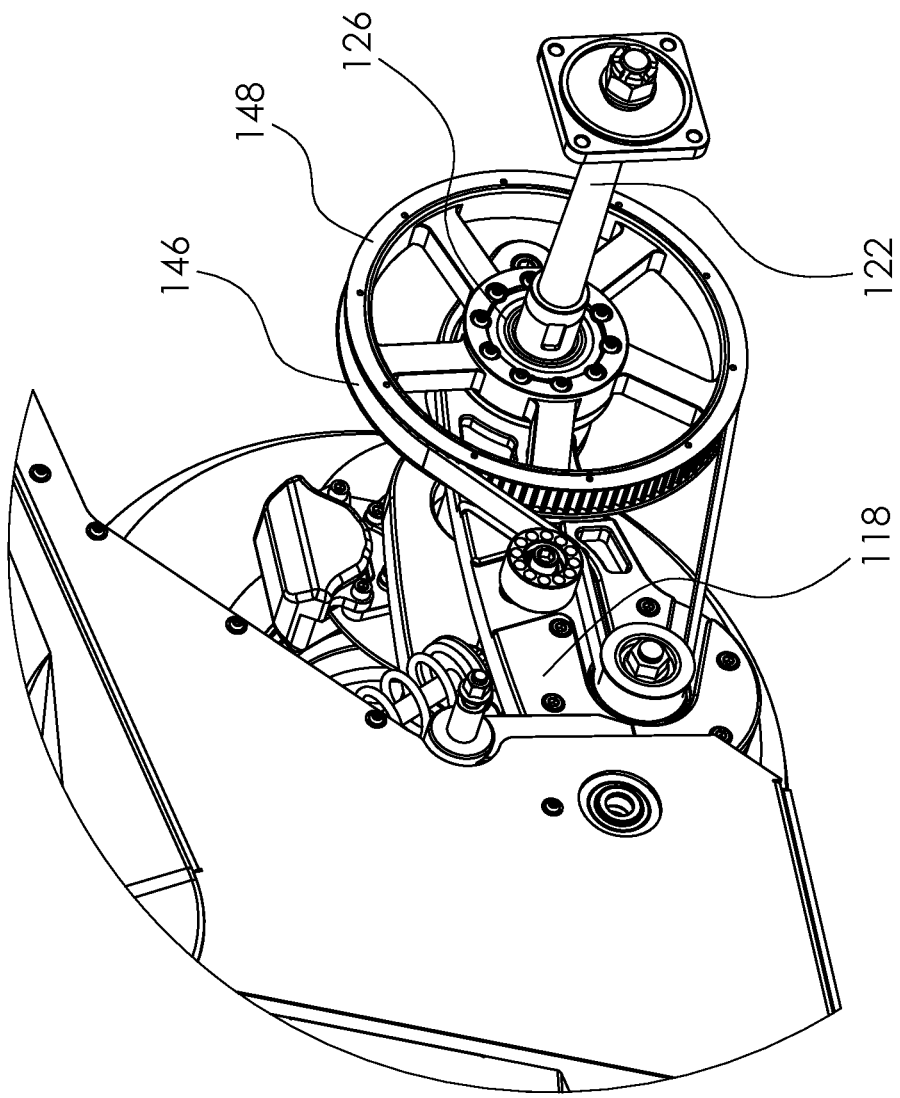
FIG. 10D is a close-up view of the motor drive train of the electric tricycle shown in FIG. 1
Figure 10E:
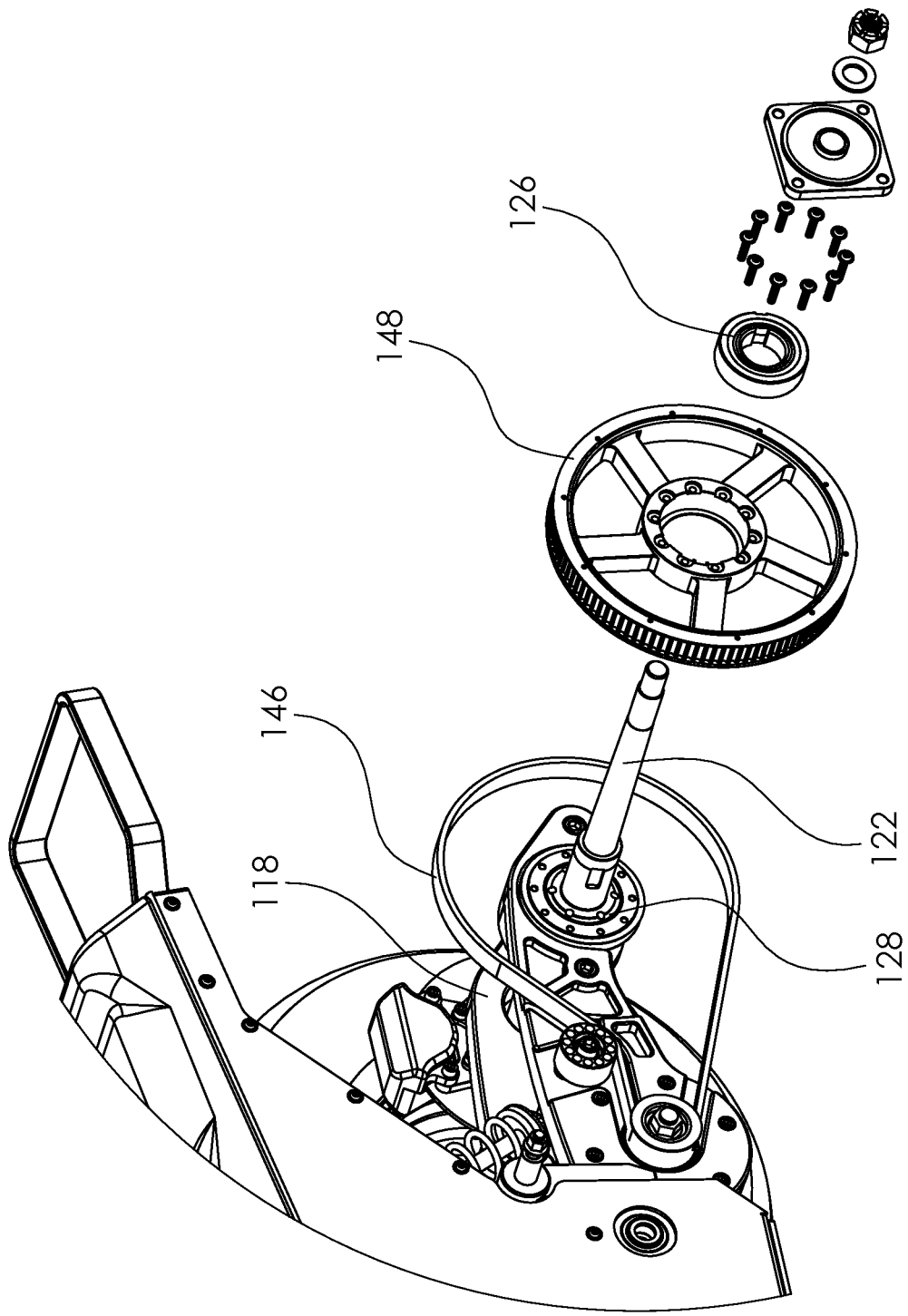
FIG. 10E is an exploded view of the motor drive train shown in FIG. 10D.

FIGS. 10A-10E illustrate different embodiments of the drive train for the electric tricycle 100. FIG. 10A illustrates both the pedal drive train and the motor drive train. In the embodiments shown, the electric tricycle 100 is belt driven. However, the electric tricycle 100 may also implement a chain (including a roller chain, segmented chain, or articulated chain) or another equivalent driving mechanism for the same purpose. FIGS. 10B-10C illustrate the pedal drive train and FIGS. 10D-10E illustrate the motor drive train. As shown, the pedal drive train comprises the pedal clutch 125, while the motor drive train comprises the forward clutch 126 and the reverse clutch 128. Thus, when the pedals 104 are pedaled, the pedals 104 turn the pedal belt 142, which turns the pedal pulley 144. The pedal pulley 144 engages with the pedal clutch 125 to rotate the rear axle 122 in the first direction. On the other hand, when the electric motor 102 turns in the first direction, the motor 102 turns the motor belt 146, which turns the motor pulley 148. The motor pulley 148 engages with the forward clutch 126 to rotate the rear axle 122 in the first direction. When the electric motor 102 turns in the second direction, the motor 102 turns the motor belts 146, which turns the motor pulley 148. Because the forward clutch 126 comprises a one-way bearing, the forward clutch 126 spins freely as the motor pulley 148 turns in the second direction and engages with the reverse clutch 128. The reverse clutch 128 engages with the rear axle 122, and thus turns the rear axle 122 in the second direction. By decoupling the pedals 104 and the electric motor 102, a party or user may pedal without the mechanical disadvantage of turning the motor by the mechanical movement of the pedals. Conversely, a party or user may engage the electric motor 102 to drive the trike 100 (and drive the rear axle 122 and rear wheels 120) without engaging the pedals 104, thereby allowing the user to have their legs remain stationary with the pedals 104 acting as footrests or pegs.

It will be understood that implementations of an electric tricycle are not limited to the specific assemblies, devices and components disclosed in this document, as virtually any assemblies, devices and components consistent with the intended operation of an electric tricycle may be used. Accordingly, for example, although particular electric tricycles, and other assemblies, devices and components are disclosed, such may include any shape, size, style, type, model, version, class, measurement, concentration, material, weight, quantity, and/or the like consistent with the intended operation of electric tricycles. Implementations are not limited to uses of any specific assemblies, devices and components; provided that the assemblies, devices and components selected are consistent with the intended operation of an electric tricycle.

Accordingly, the components defining any electric tricycle may be formed of any of many different types of materials or combinations thereof that can readily be formed into shaped objects provided that the materials selected are consistent with the intended operation of an electric tricycle. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, nickel, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof. In instances where a part, component, feature, or element is governed by a standard, rule, code, or other requirement, the part may be made in accordance with, and to comply under such standard, rule, code, or other requirement.

Various electric tricycles may be manufactured using conventional procedures as added to and improved upon through the procedures described here. Some components defining an electric tricycle may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that methods for manufacturing or assembling electric tricycles are not limited to the specific order of steps as disclosed in this document. Any steps or sequence of steps of the assembly of an electric tricycle indicated herein are given as examples of possible steps or sequence of steps and not as limitations, since various assembly processes and sequences of steps may be used to assemble electric tricycles.

The implementations of an electric tricycle described are by way of example or explanation and not by way of limitation. Rather, any description relating to the foregoing is for the exemplary purposes of this disclosure, and implementations may also be used with similar results for a variety of other applications employing an electric tricycle.

What is claimed is:

1. An electric tricycle comprising:
    a tricycle frame having a front end coupled to a steering assembly, the steering assembly having handlebars and only one front wheel, and a rear end coupled to a rear wheel assembly, the rear wheel assembly having two rear wheels mounted on a rear axle, wherein each of the only one front wheel and the two rear wheels is an off-road wheel formed with a solid, spokeless construction;
    at least two pedals rotatably coupled to the rear wheel assembly, the at least two pedals having an engaged configuration wherein the at least two pedals are engaged with the rear axle and configured to move in a reciprocating motion and rotate the rear axle in a first direction, and a disengaged configuration wherein each of the at least two pedals is disengaged from the rear axle, fixed in relation to the tricycle frame, and aligned with another of the at least two pedals, wherein the at least two pedals are configured to move between the engaged configuration and the disengaged configuration without altering a position of the tricycle frame; and
    an electric motor mounted on the rear wheel assembly, electrically coupled to a battery, and configured to engage with the rear axle when the at least two pedals are in the disengaged configuration, the electric motor having a forward clutch configured to rotate the rear axle in the first direction and a reverse clutch configured to rotate the rear axle in a second direction opposite the first direction.

2. The electric tricycle of claim 1, wherein the reciprocating motion comprises an arc.

3. The electric tricycle of claim 2, wherein the arc is less than 360 degrees.

4. The electric tricycle of claim 1, wherein, when moving in the reciprocating motion, a first pedal of the at least two pedals and a second pedal of the at least two pedals move in opposite directions.

5. An electric tricycle, comprising:
    a tricycle frame having a front end coupled to a steering assembly, the steering assembly having a front wheel, and a rear end coupled to a rear wheel assembly, the rear wheel assembly having two rear wheels mounted on a rear axle, wherein each of the front wheel and the two rear wheels is an off-road wheel formed with a spokeless construction;
    at least two pedals rotatably coupled to the rear wheel assembly and configured to move in a reciprocating motion, the at least two pedals having an engaged configuration wherein the at least two pedals are engaged with the rear axle and configured to rotate the rear axle in a first direction, and a disengaged configuration wherein each of the at least two pedals is disengaged from the rear axle; and
    an electric motor mounted on the rear wheel assembly, electrically coupled to a battery, and configured to engage with the rear axle when the at least two pedals are in the disengaged configuration, the electric motor configured to rotate the rear axle in the first direction and in a second direction opposite the first direction.

6. The electric tricycle of claim 5, wherein the reciprocating motion comprises an arc of less than 360 degrees.

7. The electric tricycle of claim 5, wherein, when the at least two pedals are in the disengaged configuration, each of the at least two pedals is fixed in relation to the tricycle frame and aligned with another of the at least two pedals.

8. The electric tricycle of claim 5, wherein, when moving in the reciprocating motion, a first pedal of the at least two pedals and a second pedal of the at least two pedals move in opposite directions.

9. The electric tricycle of claim 5, the electric motor having a forward clutch configured to rotate the rear axle in the first direction.

10. The electric tricycle of claim 5, the electric motor having a reverse clutch configured to rotate the rear axle in the second direction.

11. An electric tricycle, comprising:
    a frame having a front end coupled to a steering assembly, the steering assembly having a front wheel, and a rear end coupled to a rear wheel assembly, the rear wheel assembly having two rear wheels;
    at least two pedals rotatably coupled to the rear wheel assembly and configured to move in a reciprocating motion, the at least two pedals having an engaged configuration wherein the at least two pedals are engaged with the two rear wheels and configured to rotate the two rear wheels in a first direction, and a disengaged configuration wherein each of the at least two pedals is disengaged from the two rear wheels and aligned with another of the at least two pedals, wherein the at least two pedals are configured to move between the engaged configuration and the disengaged configuration without altering a position of the tricycle frame; and an electric motor electrically coupled to a battery and configured to engage with the two rear wheels and to rotate the two rear wheels in the first direction.

12. The electric tricycle of claim 11, wherein, when moving in the reciprocating motion, a first pedal of the at least two pedals and a second pedal of the at least two pedals move in opposite directions.

13. The electric tricycle of claim 11, the electric motor having a forward clutch configured to rotate the two rear wheels in the first direction.

14. The electric tricycle of claim 11, wherein the electric motor is also configured to rotate the two rear wheels in a second direction opposite the first direction.

15. The electric tricycle of claim 14, the electric motor having a reverse clutch configured to rotate the two rear wheels in the second direction.

16. The electric tricycle of claim 11, wherein the frame is formed of sheet metal.

17. The electric tricycle of claim 11, wherein the frame is formed of tubing.

18. The electric tricycle of claim 11, wherein the reciprocating motion comprises an arc.

19. The electric tricycle of claim 18, wherein the arc is less than 360 degrees.

20. The electric tricycle of claim 11, the steering assembly further having handlebars.

\* \* \* \* \*